(12) United States Patent
Wakabayashi

(10) Patent No.: US 11,624,015 B2
(45) Date of Patent: Apr. 11, 2023

(54) FIBER BODY FORMING METHOD AND FIBER BINDING LIQUID

(71) Applicant: SEIKO EPSON CORPORATION, Tokyo (JP)

(72) Inventor: Shigemi Wakabayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 367 days.

(21) Appl. No.: 16/893,548

(22) Filed: Jun. 5, 2020

(65) Prior Publication Data
US 2020/0385616 A1 Dec. 10, 2020

(30) Foreign Application Priority Data

Jun. 7, 2019 (JP) .............................. JP2019-107077

(51) Int. Cl.
| | | |
|---|---|---|
| *C09J 167/00* | (2006.01) | |
| *C09J 175/00* | (2006.01) | |
| *B29B 15/00* | (2006.01) | |
| *C09J 175/04* | (2006.01) | |
| *B29B 15/10* | (2006.01) | |
| *B29K 101/12* | (2006.01) | |

(52) U.S. Cl.
CPC ............. *C09J 175/04* (2013.01); *B29B 15/10* (2013.01); *C09J 167/00* (2013.01); *B29K 2101/12* (2013.01)

(58) Field of Classification Search
CPC ...... C09J 167/00; C09J 175/00; C09J 175/04; B29B 15/00; B29B 15/10
See application file for complete search history.

(56) References Cited

FOREIGN PATENT DOCUMENTS

| JP | 2009-293159 A | 12/2009 |
|---|---|---|
| JP | 2016-172935 A | 9/2016 |

*Primary Examiner* — Jacob T Minskey
*Assistant Examiner* — Matthew Hoover
(74) *Attorney, Agent, or Firm* — Global IP Counselors, LLP

(57) ABSTRACT

A fiber body forming method includes a step of applying, to a fiber body containing fibers, a liquid containing a thermoplastic resin which binds the fibers; and a step of heating the fiber body to which the liquid is applied, and in this method, the thermoplastic resin has a glass transition temperature of 10° C. or less, and the thermoplastic resin in the liquid has an average particle diameter of 30 nm or less.

8 Claims, 4 Drawing Sheets

FIG. 7

| COMPONENT | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | COMPARATIVE EXAMPLE 1 | COMPARATIVE EXAMPLE 2 | COMPARATIVE EXAMPLE 3 |
|---|---|---|---|---|---|---|---|---|---|---|---|---|
| | RESIN 1 | 10 | - | - | 5 | 15 | - | - | - | - | - | - |
| | RESIN 2 | - | 10 | - | - | - | - | - | - | - | - | - |
| | RESIN 3 | - | - | - | - | - | - | - | - | 10 | - | - |
| | RESIN 4 | - | - | - | - | - | - | - | - | - | 10 | - |
| | RESIN 5 | - | - | 10 | - | - | - | - | - | - | - | - |
| | RESIN 6 | - | - | - | - | - | 10 | - | - | - | - | - |
| | RESIN 7 | - | - | - | - | - | - | 10 | - | - | - | - |
| | RESIN 8 | - | - | - | - | - | - | - | 10 | - | - | 10 |
| | GLYCERIN | 10 | 10 | 10 | 10 | 10 | 10 | 10 | 10 | 10 | 10 | 10 |
| | PROPYLENE GLYCOL | 10 | 10 | 10 | 10 | 10 | 10 | 10 | 10 | 10 | 10 | 10 |
| | OLFINE E1010 | 1 | 1 | 1 | 1 | 1 | 1 | 1 | 1 | 1 | 1 | 1 |
| | ACETYLENOL 104PC50 | 0.5 | 0.5 | 0.5 | 0.5 | 0.5 | 0.5 | 0.5 | 0.5 | 0.5 | 0.5 | 0.5 |
| VISCOSITY (mPa·s) | | 6.2 | 7.1 | 8.3 | 3.4 | 12.5 | 6.2 | 8.4 | 5.1 | 6.7 | 5.9 | 6.4 |
| APPLICATION AMOUNT (mg/cm²) | | 0.75 | 0.61 | 0.54 | 0.63 | 0.78 | 0.03 | 0.59 | 0.84 | 0.72 | 0.79 | 0.71 |
| GLASS TRANSITION TEMPERATURE Tg (°C) | | -10 | -17 | 0 | -10 | -10 | -10 | -45 | 10 | 43 | -42 | -14 |
| AVERAGE PARTICLE DIAMETER (nm) | | 10 | 10 | 10 | 10 | 10 | 10 | 20 | 30 | 20 | 70 | 120 |
| PAPER POWDER GENERATION AMOUNT (PIECES) | | 4 | 5 | 7 | 8 | 10 | 10 | 9 | 10 | 15 | 21 | 37 |
| DRYING PROPERTY | | A | A | A | B | A | A | A | A | A | A | A |
| INK JET APPLICABILITY | | A | A | A | A | B | A | A | A | A | A | A |

FIBER BODY FORMING METHOD AND FIBER BINDING LIQUID

The present application is based on, and claims priority from JP Application Serial Number 2019-107077, filed Jun. 7, 2019, the disclosure of which is hereby incorporated by reference herein in its entirety.

BACKGROUND

1. Technical Field

The present disclosure relates to a fiber body forming method and a fiber binding liquid.

2. Related Art

A fiber body forming method in which fibers are bound with a resin has been known.

For example, JP-A-2009-293159 has disclosed coated paper which uses thermoplastic organic particles having an average particle diameter of 30 to 5,000 nm and a glass transition temperature of 30° C. to 130° C.

However, under the conditions disclosed in JP-A-2009-293159, paper powder generation may not be sufficiently suppressed in some cases.

SUMMARY

According to an aspect of the present disclosure, there is provided a fiber body forming method which comprises: a step of applying, to a fiber body containing fibers, a liquid containing a thermoplastic resin which binds the fibers; and a step of heating the fiber body to which the liquid is applied, and in the method described above, the thermoplastic resin has a glass transition temperature of 10° C. or less and has an average particle diameter of 30 nm or less in the liquid.

In the fiber body forming method according to the above aspect of the present disclosure, the liquid may have a viscosity of 5.0 to 10.0 mPa·s at 25° C.

In the fiber body forming method according to the above aspect of the present disclosure, in the step of applying a liquid, the liquid may be applied so that the mass of the thermoplastic resin with respect to the fiber body is 0.03 to 1.0 mg/cm$^2$.

In the fiber body forming method according to the above aspect of the present disclosure, the content of the thermoplastic resin in the liquid may be more than 5 to less than 15 percent by mass.

In the fiber body forming method according to the above aspect of the present disclosure, the thermoplastic resin may be selected from a polyurethane and a polyester.

In the fiber body forming method according to the above aspect of the present disclosure, in the step of applying a liquid, the liquid may be applied by an ink jet method.

The fiber body forming method according to the above aspect of the present disclosure may further comprise a step of depositing fibers to form the fiber body.

In the fiber body forming method according to the above aspect of the present disclosure, the liquid may contain another thermoplastic resin having a glass transition temperature higher than that of the thermoplastic resin.

According to another aspect of the present disclosure, there is provided a fiber binding liquid containing a thermoplastic resin which has a glass transition temperature of 10° C. or less and an average particle diameter of 30 nm or less in a liquid.

The fiber binding liquid according to the above another aspect of the present disclosure may have a viscosity of 5.0 to 10.0 mPa·s at 25° C.

In the fiber binding liquid according to the above another aspect of the present disclosure, the content of the thermoplastic resin may be more than 5 to less than 15 percent by mass.

In the fiber binding liquid according to the above another aspect of the present disclosure, the thermoplastic resin may be selected from a polyurethane and a polyester.

The fiber binding liquid according to the above another aspect of the present disclosure may further contain another thermoplastic resin having a glass transition temperature higher than that of the thermoplastic resin.

BRIEF DESCRIPTION OF THE DRAWINGS

FIG. 7 is a table showing liquid components of Examples 1 to 8 and Comparative Examples 1 to 3 and evaluation results thereof.

DESCRIPTION OF EXEMPLARY EMBODIMENTS

Hereinafter, preferable embodiments of the present disclosure will be described in detail with reference to the drawings. In addition, the following embodiments do not unreasonably limit the content of the present disclosure described in the claims. In addition, all the structures described below are not always required to be necessary constituent elements of the present disclosure.

1. FIBER BODY FORMING METHOD

Figure 1:
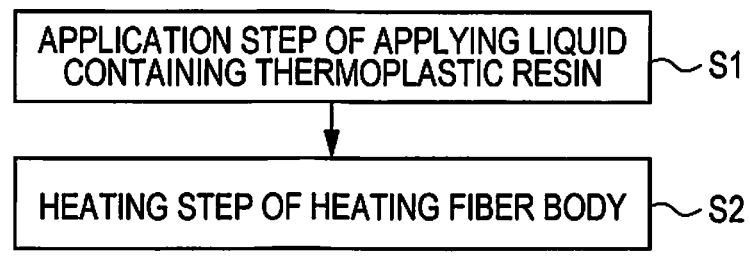
FIG. 1 is a flowchart illustrating a fiber body forming method according to this embodiment.

First, a fiber body forming method according to this embodiment will be described with reference to the drawings. FIG. 1 is a flowchart illustrating the fiber body forming method according to this embodiment.

As shown in FIG. 1, the fiber body forming method according to this embodiment comprises an application step (Step S1) of applying, to a fiber body containing fibers, a liquid containing a thermoplastic resin which binds the fibers and a heating step (Step S2) of heating the fiber body to which the liquid is applied. Hereinafter, the fiber body forming method will be described below in accordance with the order of the steps.

1.1. Application Step 1.1.1. Fiber Body

The fiber body contains fibers. The fibers contained in the fiber body are, for example, cellulose fibers. As the cellulose fibers, for example, natural cellulose fibers or chemical cellulose fibers may be mentioned. In more particular, as the cellulose fibers, for example, cellulose fibers formed from a cellulose, a cotton, a hemp, a kenaf, a flax, a ramie, a jute, a Manila hemp, a Sisal hemp, a coniferous tree, or a broadleaf tree may be mentioned; those cellulose fibers may be used alone, or at least two types thereof may be used in combination; and those cellulose fibers may be used as regenerated cellulose fibers after being refined or the like. In addition, the cellulose fibers may be dried, may contain a liquid, such as water or an organic solvent, or may be impregnated therewith. Furthermore, the cellulose fibers may be processed by various types of surface treatments.

The fibers contained in the fiber body are classified into long fibers functioning to maintain a paper strength and short fibers which are liable to be formed into a paper powder. When the long fibers contained in the fiber body are each regarded as an independent fiber, the average diameter thereof is, for example, 1.0 to 1,000.0 μm and is preferably 5.0 to 100.0 μm. Although the length of the long fiber is not particularly limited, as one independent fiber, a length of the long fiber along a longitudinal direction is, for example, 1.0 μm to 5.0 mm. A length of the short fiber along a longitudinal direction is shorter than that of the long fiber along a longitudinal direction and is, for example, less than 1.0 μm.

Before the liquid is applied, the fiber body may contain a thermoplastic resin which binds fibers. As the thermoplastic resin, for example, there may be mentioned a polyurethane, a polyester, an AS resin, an ABS resin, a polypropylene, a polyethylene, a poly(vinyl chloride), a polystyrene, an acrylic resin, a poly(ethylene terephthalate), a poly(phenylene ether), a poly(butylene terephthalate), a nylon, a polyamide, a polycarbonate, a polyacetate, a poly(phenylene sulfide), or a poly(ether ether ketone). As a glass transition temperature Tg of the thermoplastic resin which may be contained before the liquid is applied is, for example, 60° C. or more, preferably 70° C. or more, and more preferably 80° C. or more. When the Tg is 60° C. or more, in the case in which a molded material is formed using the fiber body, a sufficient paper strength is likely to be obtained, and wrinkles and breakages are not likely to be generated. The Tg is, for example, 200° C. or less.

The fiber body may be a web. The "web" indicates a body in which fibers contained in a fiber body are not bound with a binder. The web indicates, for example, a softly expanded body with a large amount of air incorporated therein. When the fiber body is a web, the fibers contained in the fiber body may be defibrated fibers, that is, a defibrated material, which are defibrated into fibers by performing a defibrating treatment on a material to be defibrated. As the material to be defibrated, for example, there may be mentioned waste paper, a pulp sheet, tissue paper, kitchen paper, a cleaner, a filter, a liquid absorber, a sound absorber, a buffer material, a mat, or a cardboard.

When the fiber body is a web, the thickness of the fiber body is, for example, 0.5 to 30.0 mm and preferably 1.0 to 20.0 mm. When the fiber body is a web, a bulk density of the fiber body is, for example, 0.01 to 0.50 g/cm$^3$ and preferably 0.02 to 0.20 g/cm$^3$.

The fiber body may be a sheet. The "sheet" indicates a material in which fibers contained in a fiber body are bound to each other with a binder. As the sheet, for example, waste paper, a pulp sheet, tissue paper, or kitchen paper may be mentioned. The thickness of the sheet is smaller than that of the web. The bulk density of the sheet is higher than that of the web.

1.1.2. Liquid

The liquid contains a thermoplastic resin having a Tg of 10° C. or less. The thermoplastic resin contained in the liquid binds the fibers contained in the fiber body. In this embodiment, the "thermoplastic resin binds the fibers" indicates a state in which particles of the thermoplastic resin are disposed between the fibers, and the fibers are not likely to be separated from each other due to the thermoplastic resin interposed therebetween. The liquid is a fiber binding liquid which binds the fibers and a resin emulsion containing a thermoplastic resin.

As the thermoplastic resin contained in the liquid, for example, although the thermoplastic resin contained in the fiber body described above may be mentioned, in particular, a polyurethane or a polyester is preferably selected. Solubility parameter (SP) values of a polyurethane and a polyester are 10.0 to 11.0, a SP value of an acrylic resin is 9.0 to 9.5, and a SP value of cellulose fibers is 15.6. Incidentally, since the SP value is a parameter indicating the solubility and/or the compatibility of a substance, values close to each other indicate a high compatibility, that is, a high affinity, between two substances, and values apart from each other indicates a low affinity therebetween. Since the SP values of a polyurethane and a polyester are each close to that of cellulose fibers as compared to the SP value of an acrylic resin, a polyurethane or a polyester has a high affinity to cellulose fibers and is likely to bind the fibers.

In this embodiment, FIGS. 2 and 3 and FIGS. 4 and 5 which will be described below are views each illustrating binding of short fibers with a thermoplastic resin contained in the liquid. In addition, for the convenience of illustration, in FIGS. 2 to 5, the thermoplastic resin which may be contained in the fiber body before the liquid is applied is not shown.

Figure 2:
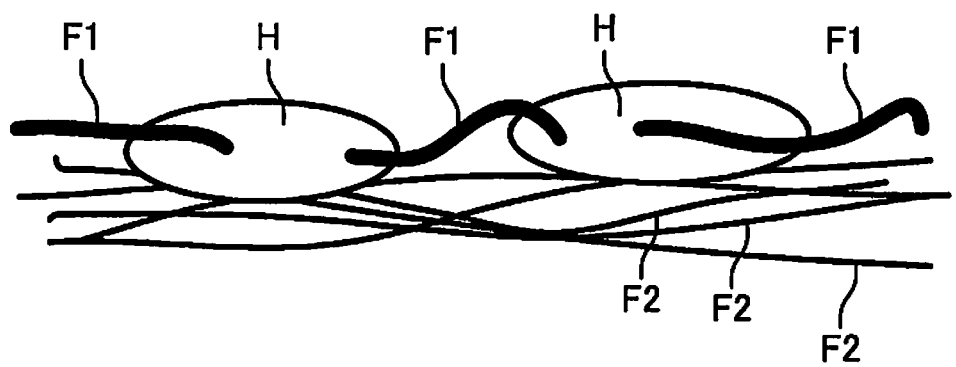
FIG. 2 is a view illustrating binding of short fibers with a thermoplastic resin.

The Tg of the thermoplastic resin contained in the liquid is 10° C. or less, preferably 0° C. or less, and more preferably −10° C. or less. When the Tg is 10° C. or less, in the heating step which will be described later, as shown in FIG. 2, since being melted or softened, a thermoplastic resin H is largely deformed. Hence, the thermoplastic resin H has a high probability of being brought into contact with short fibers F1 forming a fiber body surface and is able to bind the short fibers F1. The thermoplastic resin H may bind between the short fibers F1 or between the short fiber F1 and a long fiber F2.

The Tg of the thermoplastic resin contained in the liquid is, for example, −50° C. or more and preferably −45° C. or more. When the Tg is −50° C. or more, in the case in which the thermoplastic resin is brought into contact with short fibers, by the thermoplastic resin, the short fibers can be bound so as not to generate a paper powder.

Figure 3:
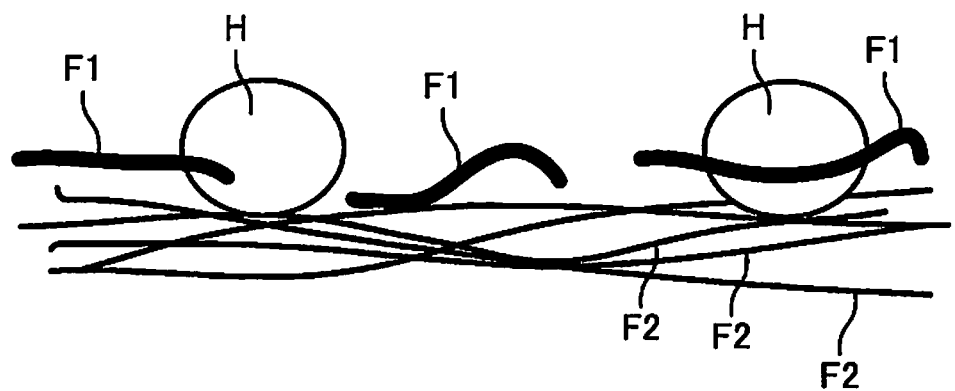
FIG. 3 is a view illustrating binding of the short fibers with a thermoplastic resin.

Unlike the example shown in FIG. 2, when the Tg of the thermoplastic resin contained in the liquid is higher than 10° C., as shown in FIG. 3, the thermoplastic resin H is not likely to be melted or softened in the heating step and is no likely to be deformed. Hence, the thermoplastic resin H has a high probability of being not brought into contact with the short fibers F1, and as a result, short fibers F1 which are not bound may be generated. The short fibers F1 which are not bound as described above are liable to form a paper powder.

The shape of the thermoplastic resin contained in the liquid is, for example, particles. As long as being particles, the thermoplastic resin may have a spherical shape, a shape having an oval cross-section, or a shape having a polygonal cross-section. The average particle diameter of the thermoplastic resin in the liquid is 30 nm or less and preferably 10 to 20 nm. In addition, the "average particle diameter" indicates the D50.

Figure 4:
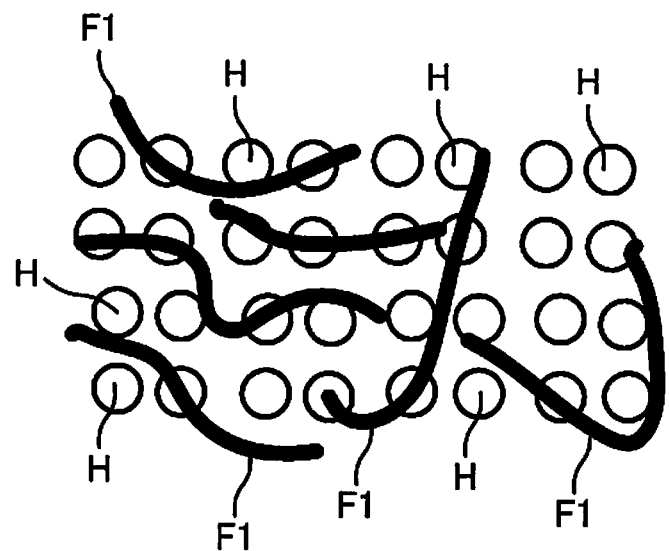
FIG. 4 is a view illustrating binding of short fibers with a thermoplastic resin.
Figure 5:
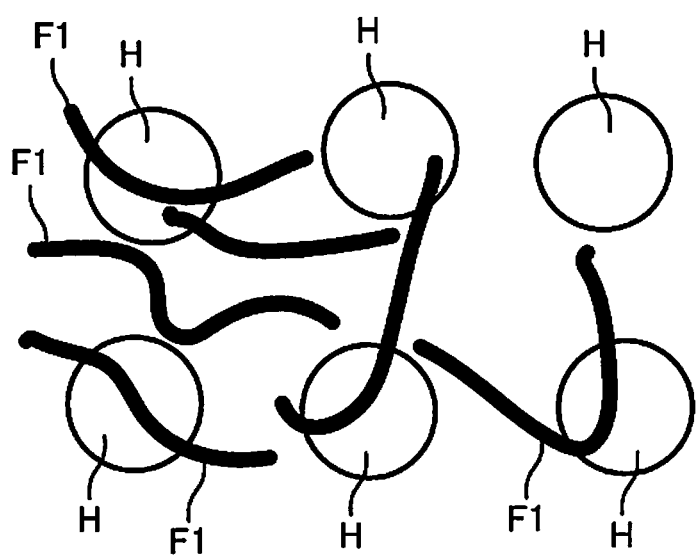
FIG. 5 is a view illustrating binding of the short fibers with a thermoplastic resin.

When the average particle diameter of the thermoplastic resin contained in the liquid is 30 nm or less in the liquid, as shown in FIG. 4, the thermoplastic resin H has a high probability of being brought into contact with the short fibers F1 forming the fiber body surface, and in the heating step, the short fibers F1 can be bound together. For example, when the average particle diameter of the thermoplastic resin H in the liquid is 30 nm or more, as shown in FIG. 5, the number of the particles of the thermoplastic resin H to be applied on the fiber body per unit area is decreased, and a coverage of the thermoplastic resin H is decreased. Hence, the thermoplastic resin H has a high probability of not being brought into contact with the short fibers F1, and short fibers which are not bound are generated. The short fibers F1 which are not bound as described above are liable to form a paper powder.

The content of the thermoplastic resin in the liquid is, for example, 5 to 15 percent by mass, preferably more than 5 to less than 15 percent by mass, and more preferably 8 to 12 percent by mass. When the content of the thermoplastic resin in the liquid is more than 5 percent by mass, a sufficient amount of the thermoplastic resin can be secured so as to bind the fibers. When the content of the thermoplastic resin in the liquid is less than 15 percent by mass, since the viscosity of the liquid is not excessively increased, the liquid can be easily applied by an ink jet method.

The viscosity of the liquid at 25° C. is, for example, 5.0 to 13.0 mPa·s, preferably 5.0 to 10.0 mPa·s, and more preferably 5.1 to 8.4 mPa·s. When the viscosity of the liquid at 25° C. is 5.0 to 10.0 mPa·s, the liquid can be easily applied by an ink jet method.

Besides the thermoplastic resin, the liquid contains water. The liquid may further contain a penetrant and/or a moisturizer.

As the penetrant, for example, there may be mentioned a glycol ether, such as triethylene glycol monobutyl ether, triethylene glycol dimethyl ether, triethylene glycol diethyl ether, triethylene glycol dibutyl ether, or triethylene glycol methyl butyl ether; a silicone-based surfactant, an acetylene glycol-based surfactant, an acetylene alcohol-based surfactant, an acetylenol-based surfactant, or a fluorine-based surfactant. The liquid may contain one of the penetrants mentioned above or at least two thereof.

As the moisturizer, for example, there may be mentioned diethylene glycol, triethylene glycol, propylene glycol, dipropylene glycol, 1,3-propanediol, 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 1,2-hexanediol, 2-ethyl-1,3-hexanediol, 3-methyl-1,5-penetandiol, 2-methylpenetane-2,4-diol, trimethylolpropane, or glycerin. The liquid may contain one of the moisturizers mentioned above or at least two thereof.

The liquid may contain another thermoplastic resin having a Tg higher than that of the thermoplastic resin having a Tg of 10° C. or less described above. As the another thermoplastic resin, the thermoplastic resin described in "1.1.1. FIBER BODY" may be used. When the liquid contains the another thermoplastic resin, even if the thermoplastic resin is not contained in the fiber body before the liquid is applied, a molded material having a high paper strength can be formed.

1.1.3. Application

In the liquid application step of applying a liquid, the liquid is applied so that the mass of the thermoplastic resin with respect to the fiber body is, for example, 0.03 to 1.0 mg/cm$^2$ and preferably 0.05 to 0.78 mg/cm$^2$. When the mass of the thermoplastic resin with respect to the fiber body is 0.03 mg/cm$^2$ or more, the liquid can be uniformly applied on the fiber body. Furthermore, when the mass of the thermoplastic resin with respect to the fiber body is 1.0 mg/cm$^2$ or less, in the case in which a molded material is formed using the fiber body, the molded material is not likely to be transparent. When the mass of the thermoplastic resin is excessively large, the molded material is liable to be transparent, and when double-side printing is performed, a character printed on a rear surface may be read from a front surface side.

In the liquid application step of applying a liquid, for example, the liquid is applied by an ink jet method. Accordingly, the liquid can be uniformly applied on the fiber body. In particular, the liquid is applied by an ink jet printer. In addition, the method for applying a liquid is not limited to the ink jet method, and for example, the liquid may be applied by a spray method. Since the thermoplastic resin is dispersed in the liquid and then applied on the fiber body as described above, compared to a method in which the thermoplastic resin and the fibers are mixed together by stirring in a mixing portion 50 which will be described below, the fibers can be suppressed from being formed into aggregates (hereinafter, referred to as "damas" in some cases).

1.2. Heating Step

The thermoplastic resin is melted or softened in the heating step, so that the fibers are bound thereby. By this step, the thermoplastic resin having a Tg of 10° C. or less contained in the liquid and the thermoplastic resin having a Tg of 60° C. or more described in "1.1.1. FIBER BODY" are both melted or softened, and the fibers are then bound thereby. In particular, as shown in FIGS. 2 and 4, the thermoplastic resin contained in the liquid binds the short fibers. By this step, the fiber body as a molded material can be formed.

In the heating step, for example, by a heating roller machine, a heat press device, a three-dimensional molding machine, or the like, the fiber body can be heated. A heating temperature in the heating step is appropriately determined, for example, in consideration of the type of thermoplastic resin and the like.

In addition, when the fiber body contains a thermoplastic resin before the application step of applying a liquid, the heating step may be performed both before and after the application step. In addition, in the heating step, the fiber body to which the liquid is applied may also be pressurized.

1.3. Other Steps

The fiber body forming method according to this embodiment may also comprise steps other than the application step and the heating step described above.

The fiber body forming method may also comprise a deposition step of depositing fibers to form a fiber body. The deposition step is performed before the application step, and in the application step, the liquid is applied to a fiber body formed in the deposition step. In the deposition step, although the fibers may be deposited by a sieve, the method is not particularly limited. In the deposition step, although the fibers may be deposited on a transport belt, such as a mesh belt, an object onto which the fibers are to be deposited is not particularly limited.

The fiber body forming method according to this embodiment may also comprise a defibration step of defibrating waste paper. The defibration step is performed before the deposition step, and in the deposition step, fibers defibrated in the defibration step are deposited. The defibration step may be performed using a dry defibrating machine.

The fiber body forming method according to this embodiment may also comprise a pressure application step of pressurizing the fiber body to which the liquid is applied. By the pressure application step, the bulk density of the fiber body in the form of a web can be increased. The pressure application step may be performed before the heating step, and in the heating step, a pressurized fiber body may be heated. In the pressure application step, for example, by a calendar roller machine, a press machine, or the like, the fiber body can be pressurized.

1.4. Effects

The fiber body forming method has, for example, the following effects.

In the fiber body forming method according to this embodiment, the Tg of the thermoplastic resin contained in the liquid is 10° C. or less, and the average particle diameter of the thermoplastic resin in the liquid is 30 nm or less. Hence, as described above, the thermoplastic resin has a high probability of being brought into contact with the short fibers forming the fiber body surface, and hence, the short fibers can be bound together. Hence, as described in the following "3. EXAMPLES AND COMPARATIVE EXAMPLES", the paper powder generation can be reduced.

In the fiber body forming method according to this embodiment, the viscosity of the liquid at 25° C. may be 5.0 to 10.0 mPa·s. Accordingly, the liquid can be easily applied by an ink jet method.

In the fiber body forming method according to this embodiment, in the application step of applying a liquid, the liquid may be applied so that the mass of the thermoplastic resin with respect to the fiber body is 0.03 to 1.0 mg/cm$^2$. Accordingly, the liquid can be uniformly applied on the fiber body, and the molded body is not likely to be transparent.

In the fiber body forming method according to this embodiment, the content of the thermoplastic resin in the liquid may be more than 5 to less than 15 percent by mass. Accordingly, while the mass of the thermoplastic resin in the liquid is secured, the liquid can be easily applied by an ink jet method.

In the fiber body forming method according to this embodiment, the thermoplastic resin may be selected from a polyurethane and a polyester. Accordingly, the affinity between the thermoplastic resin and the fibers can be increased, and hence, the fibers can be easily bound together.

In the fiber body forming method according to this embodiment, in the application step of applying a liquid, the liquid may be applied by an ink jet method. Accordingly, the liquid can be uniformly applied on the fiber body.

In the fiber body forming method according to this embodiment, the liquid may contain another thermoplastic resin having a Tg higher than the Tg of the thermoplastic resin. Accordingly, before the liquid is applied, even if the thermoplastic resin having a high Tg is not contained in the fiber body, a molded material having a high paper strength can be formed.

2. FIBER BODY FORMING APPARATUS

Figure 6:
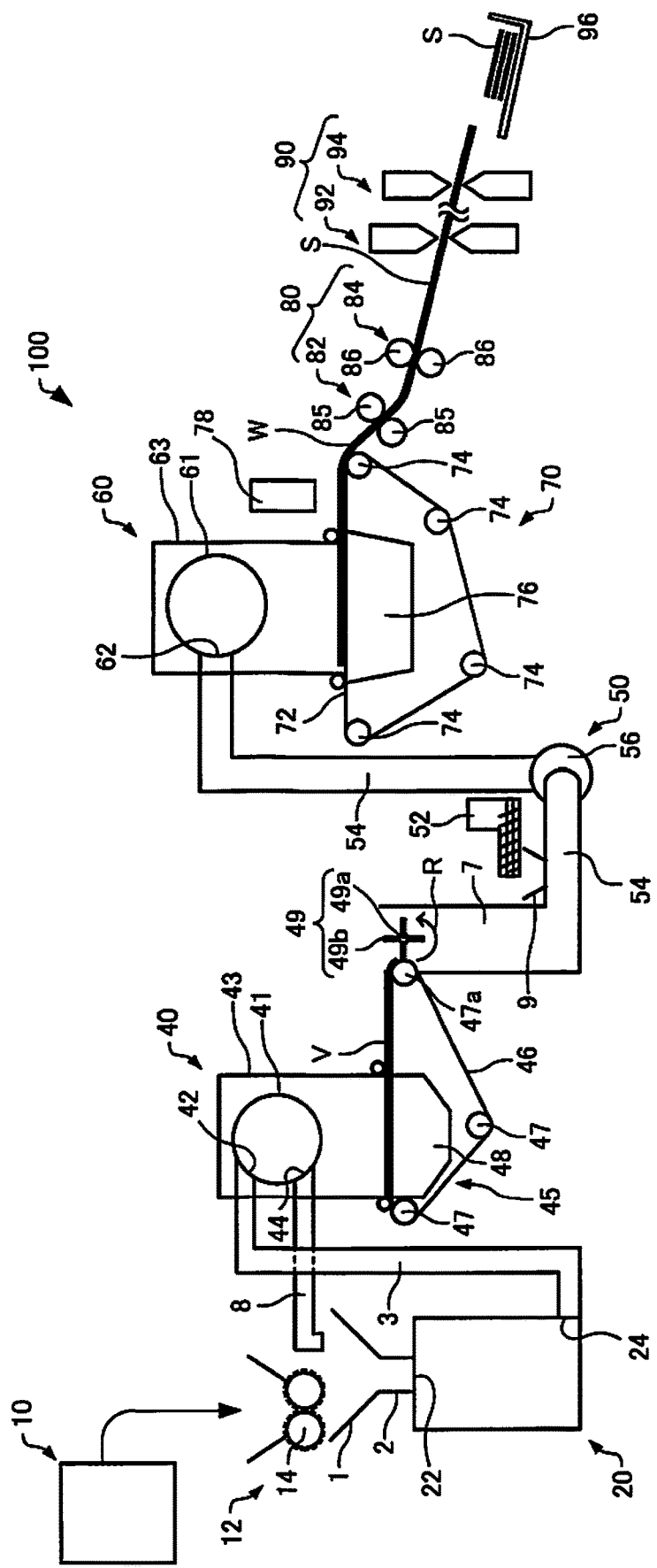
FIG. 6 is a schematic view showing a fiber body forming apparatus according to this embodiment.

Next, a fiber body forming apparatus according to this embodiment will be described with reference to the drawing. FIG. 6 is a schematic view showing a fiber body forming apparatus 100 according to this embodiment. The fiber body forming method according to this embodiment is performed, for example, using the fiber body forming apparatus 100. In addition, the fiber body forming method according to this embodiment may also be performed using another apparatus which is not shown in the drawing.

As shown in FIG. 6, the fiber body forming apparatus 100 includes a supply portion 10, a coarsely pulverizing portion 12, a defibrating portion 20, a sorting portion 40, a first web forming portion 45, a rotation body 49, the mixing portion 50, a deposition portion 60, a second web forming portion 70, a liquid application device 78, a sheet forming portion 80, and a cutting portion 90.

The supply portion 10 supplies a raw material to the coarsely pulverizing portion 12. The supply portion 10 is, for example, an automatic feed portion continuously feeding the raw material to the coarsely pulverizing portion 12. The raw material to be supplied by the supply portion 10 is a material, such as waste paper and/or a pulp sheet, containing fibers.

The coarsely pulverizing portion 12 cuts the raw material supplied by the supply portion 10 in a gas atmosphere, such as in the air, into small pieces. The small pieces each have a several centimeters square shape. In the example shown in the drawing, the coarsely pulverizing portion 12 has coarsely pulverizing blades 14 and can cut the supplied raw material thereby. As the coarsely pulverizing portion 12, for example, a shredder is used. The raw material cut in the coarsely pulverizing portion 12 is received by a hopper 1 and is then transported to the defibrating portion 20 through a tube 2.

The defibrating portion 20 defibrates the raw material cut in the coarsely pulverizing portion 12. In this case, the "defibrate" indicates that the raw material formed of fibers bound to each other is disentangled into separately independent fibers. The defibrating portion 20 also has a function to separate substances, such as resin particles, an ink, a toner, and a blurring inhibitor, each of which is adhered to the raw material, from the fibers. The defibrated material thus defibrated may be not entangled with other defibrated fibers, that is, may be independently present or may be entangled with other defibrated materials to form aggregates, that is, may be present in the form of damas.

A material passing through the defibrating portion 20 is called a "defibrated material". In the "defibrated material", besides the fibers thus disentangled, resin particles; coloring materials, such as an ink and a toner; and additives, such as a blurring inhibitor and a paper reinforcing agent, each of which is separated from the fibers when the fibers are disentangled, may also be contained in some cases.

The defibrating portion 20 performs dry defibration. A treatment, such as defibration, which is performed not in a liquid, such as water, but in a gas, such as the air, is called a dry type. As the defibrating portion 20, for example, an impellor mill is used. The defibrating portion 20 has a function to generate an air stream to suck the raw material and to discharge the defibrated material. Accordingly, the defibrating portion 20 can perform using the air stream generated thereby, a defibration treatment by sucking the raw material from an inlet port 22 together with the air stream and then can transport the defibrated material to a discharge port 24. The defibrated material passing through the defibrating portion 20 is transported to the sorting portion 40 through a tube 3. In addition, as an air stream which transports the defibrated material from the defibrating portion 20 to the sorting portion 40, the air stream generated by the defibrating portion 20 may also be used, or after an air stream generator, such as a blower, is provided, an air stream generated thereby may be used. By the defibrating portion 20, the defibration step described above can be performed.

The sorting portion 40 introduces the defibrated material defibrated in the defibrating portion 20 from an inlet port 42 and then sorts the defibrated material by the length of the fibers. The sorting portion 40 includes a drum portion 41 and a housing portion 43 receiving the drum portion 41. As the drum portion 41, for example, a sieve is used. The drum portion 41 has a net and can sort fibers and/or particles which are smaller than the opening size of this net, that is, a first sorted material passing through the net, and fibers, non-defibrated pieces, and damas which are larger than the opening size of the net, that is, a second sorted material not passing through the net. For example, the first sorted material is transported to the mixing portion 50 through a tube 7. The second sorted material is returned to the defibrating portion 20 from a discharge port 44 through a tube 8. In particular, the drum portion 41 is a cylindrical sieve rotatably driven by a motor. As the net of the drum portion 41, for example, there may be used a metal net, an expanded metal formed by expanding a metal plate provided with cut lines, or a punched metal in which holes are formed in a metal plate by a press machine or the like.

The first web forming portion 45 transports the first sorted material passing through the sorting portion 40 to the mixing portion 50. The first web forming portion 45 includes a mesh belt 46, tension rollers 47, and a suction mechanism 48.

The suction mechanism 48 can suck the first sorted material which passes through the opening of the sorting portion 40 and which is dispersed in air onto the mesh belt 46. The first sorted material is deposited on the moving mesh belt 46 to form a web V. The basic structures of the mesh belt 46, the tension rollers 47, and the suction mechanism 48 are similar to those of a mesh belt 72, tension rollers 74, and a suction mechanism 76 of the second web forming portion 70 which will be described later.

Since passing through the sorting portion 40 and the first web forming portion 45, the web V is formed so as to be softly expanded with a large amount of air incorporated therein. The web V deposited on the mesh belt 46 is charged in the tube 7 and is transported to the mixing portion 50.

The rotation body 49 can cut the web V before the web V is transported to the mixing portion 50. In the example shown in the drawing, the rotation body 49 includes a base portion 49a and protruding portions 49b protruding from the base portion 49a. The protruding portion 49b has, for example, a plate shape. In the example shown in the drawing, four protruding portions 49b are provided with regular intervals. When the base portion 49a is rotated in a direction R, the protruding portions 49b can be rotated around the base portion 49a. Since the web V is cut by the rotation body 49, for example, the change in amount of the defibrated material per unit time to be supplied to the deposition portion 60 can be reduced.

The rotation body 49 is provided in the vicinity of the first web forming portion 45. In the example shown in the drawing, the rotation body 49 is provided in the vicinity of a tension roller 47a located downstream in a path of the web V. The rotation body 49 is provided at a position at which the protruding portion 49b can be brought into contact with the web V and cannot be brought into contact with the mesh belt 46. Accordingly, the mesh belt 46 can be suppressed from being abraded by the protruding portions 49b. The shortest distance between the mesh belt 46 and the protruding portion 49b is, for example, 0.05 to 0.5 mm. This is a distance at which the web V can be cut without causing damage on the mesh belt 46.

The mixing portion 50 mixes the first sorted material passing through the sorting portion 40 and additives containing a resin. The mixing portion 50 includes an additive supply portion 52 supplying the additives, a tube 54 transporting the first sorted material and the additives, and a blower 56. In the example shown in the drawing, the additives are supplied from the additive supply portion 52 to the tube 54 through a hopper 9. The tube 54 is coupled to the tube 7.

In the mixing portion 50, an air stream is generated by the blower 56, and the first sorted material and the additives can be transported through the tube 54 while being mixed with each other. In addition, a mechanism to mix the first sorted material and the additives is not particularly limited, and for example, a mechanism in which stirring is performed by at least one high speed rotational blade or a mechanism, such as a V-type mixer, which uses rotation of a container may be used.

As the additive supply portion 52, a screw feeder as shown in FIG. 6 or a disc feeder not shown may be used. The additives to be supplied from the additive supply portion 52 may include the thermoplastic resin described in the above "1.1.1. FIBER BODY". When the thermoplastic resin is supplied, the fibers are not bound to each other. The resin is melted when passing through the sheet forming portion 80, so that the fibers are bound together. In addition, although not shown in the drawing, when a liquid to be applied by the liquid application device 78 which will be described later contains a thermoplastic resin having a Tg of 60° C. or more, the additive supply portion 52 may be not provided.

In addition, as the additives to be supplied from the additive supply portion 52, besides the thermoplastic resin to bind the fibers, in accordance with the type of sheet to be manufactured, a coloring agent which colors fibers, an aggregation suppressor which suppresses aggregation of fibers and/or resin particles, and/or a flame retardant which enables fibers and the like to be hardly combustible may also be contained. The mixture passing through the mixing portion 50, that is, the mixture of the first sorted material and the additives, is transported to the deposition portion 60 through the tube 54.

After the deposition portion 60 introduces the mixture passing through the mixing portion 50 from an inlet port 62, the entangled defibrated material, that is, the fibers, are disentangled and allowed to fall down while being dispersed in air. Furthermore, when the thermoplastic resin of the additives to be supplied from the additive supply portion 52 is in the form of fibers, the deposition portion 60 disentangles the entangled thermoplastic resin. Accordingly, the deposition portion 60 is able to uniformly deposit the mixture on the second web forming portion 70.

The deposition portion 60 includes a drum portion 61 and a housing portion 63 receiving the drum portion 61. As the drum portion 61, a rotatable cylindrical sieve is used. The drum portion 61 has a net and allows fibers and/or particles which are contained in the mixture passing through the mixing portion 50 and which are smaller than the opening size of the net to fall down. The structure of the drum portion 61 is, for example, the same as that of the drum portion 41. By the deposition portion 60, the above deposition step can be performed.

In addition, the "sieve" of the drum portion 61 may not have a function to sort a specific object. That is, the "sieve" to be used as the drum portion 61 indicates a member provided with a net, and the drum portion 61 may allows all of the mixture introduced thereinto to fall down.

The second web forming portion 70 deposits a passing material passing through the deposition portion 60 to form a web W. The second web forming portion 70 includes, as described above, the mesh belt 72, the tension rollers 74, and the suction mechanism 76.

While being transferred, the mesh belt 72 allows the passing material passing through the opening of the deposition portion 60 to deposit. The mesh belt 72 is stretched by the tension rollers 74 and has the structure in which air is supplied so that the passing material is not likely to pass. The mesh belt 72 is transferred by the rotation of the tension rollers 74. While the mesh belt 72 is continuously transferred, the passing material passing through the deposition portion 60 is allowed to continuously fall down and deposit, so that the web W is formed on the mesh belt 72. The mesh belt 72 is formed, for example, of a metal, a resin, a cloth, or a non-woven cloth.

The suction mechanism 76 is provided under the mesh belt 72. The suction mechanism 76 can generate a downward air stream. By the suction mechanism 76, the mixture dispersed in air by the deposition portion 60 can be sucked on the mesh belt 72. Accordingly, a discharge rate from the deposition portion 60 can be increased. Furthermore, by the suction mechanism 76, a downflow can be formed in a path in which the mixture falls, and the defibrated materials and/or the additives are prevented from being entangled during the falling.

As described above, since passing through the deposition portion 60 and the second web forming portion 70, the web W can be formed so as to be softly expanded with a large amount of air incorporated therein. The web W deposited on the mesh belt 72 is transported to the sheet forming portion 80. The web W is the fiber body described in the above "1.1.1. FIBER BODY".

The liquid application device 78 applies the liquid described in the above "1.1.2. LIQUID" on the web W. The liquid application device 78 is, for example, an ink jet head. By the liquid application device 78, the above application step can be performed.

The sheet forming portion 80 forms a sheet S by pressure heating of the web W to which the liquid is applied. The sheet forming portion 80 can bind the fibers with the thermoplastic resin by applying heat to the web W to which the liquid is applied.

The sheet forming portion 80 includes a pressure application portion 82 pressuring the web W and a heating portion 84 heating the web W pressurized by the pressure application portion 82. The pressure application portion 82 is formed of a pair of calendar rollers 85 and applies a pressure to the web W. Since the web W is pressurized, the thickness thereof is decreased, and the density of the web W is increased. In the example shown in the drawing, the heating portion 84 includes a pair of heating rollers 86. Since the heating portion 84 is formed of the heating rollers 86, compared to the case in which the heating portion 84 is formed as a plate-shaped press machine, the sheet S can be formed while the web W is continuously transported. The calendar rollers 85 and the heating rollers 86 are disposed, for example, so that the rotation shafts thereof are in parallel to each other. In this case, the calendar rollers 85 can apply a higher pressure to the web W than that to be applied to the web W by the heating rollers 86. In addition, the number of the calendar rollers 85 and the number of the heating rollers 86 are not particularly limited. By the pressure application portion 82, the above pressure application step can be performed. By the heating portion 84, the above heating step can be performed.

The cutting portion 90 cuts the sheet S formed by the sheet forming portion 80. In the example shown in the drawing, the cutting portion 90 includes a first cutting portion 92 cutting the sheet S in a direction intersecting the transportation direction of the sheet S and a second cutting portion 94 cutting the sheet S in the direction in parallel to the transportation direction. The second cutting portion 94 cuts, for example, the sheet S passing through the first cutting portion 92.

Accordingly, a single sheet S having a predetermined size is formed. The single sheet S thus cut is discharged to a discharge portion 96.

3. EXAMPLES AND COMPARATIVE EXAMPLES 3.1. Preparation of Liquid

Liquids of Examples 1 to 8 and Comparative Examples 1 to 3 were prepared. FIG. 7 is a table showing the components of the liquids of Examples 1 to 8 to Comparative Examples 1 to 3. The numerical unit in the table indicates percent by mass. The total is represented by 100 percent by mass by addition of water as the balance. In addition, as "glycerin" and "propylene glycol" in the table, commercially available reagents were used, and the other components are as shown below. In addition, the "application amount" in the table indicates the mass of a resin with respect to the fiber body, which is, an object to which the liquid is applied.

Resin 1: Superflex 420 (polyurethane, manufactured by DKS Co., Ltd.)
Resin 2: Superflex 650 (polyurethane, manufactured by DKS Co., Ltd.)
Resin 3: Superflex 620 (polyurethane, manufactured by DKS Co., Ltd.)
Resin 4: Superflex 300 (polyurethane, manufactured by DKS Co., Ltd.)
Resin 5: Aron Melt PES 2000A3 (polyester, manufactured by Toagosei Co., Ltd.)
Resin 6: Ucoat UWS145 (polyurethane, manufactured by Sanyo Chemical Industries, Ltd.)
Resin 7: Styrene-acrylic resin (copolymer resin of 50 parts by mass of styrene, 9 parts by mass of methyl methacrylate (MMA), and 38 parts by mass of 2-ethylhexyl acrylate, weight average molecular weight: 6,000)
Resin 8: Styrene-butadiene rubber (SBR) latex (T-2550K, manufactured by JSR Corporation)
Olfine E1010 (manufactured by Nisshin Chemical Industry Co., Ltd.)
Acetylenol 104PD50 (manufactured by Nisshin Chemical Industry Co., Ltd.)

By the use of the liquids of Examples 1 to 8 and Comparative Examples 1 to 3, the viscosity of the liquid, the Tg of the resin, and the average particle diameter of the resin were measured. The viscosity was measured at a temperature of 25° C. and a revolution rate of 100 rpm using an E type viscometer "TV-25" manufactured by Toki Sangyo Co., Ltd.). The Tg was measured using a differential scanning calorimeter (DSC) "Q1000" manufactured by TA Instruments Inc.). The average particle diameter was measured using a particle size distribution meter "Nanotrac Wave II-EX150" manufactured by MicrotracBell, and the D50 value obtained by the measurement was regarded as the average particle diameter.

3.2. Evaluation

After paper making was performed using the liquids of Examples 1 to 8 and Comparative Examples 1 to 3, a paper powder generation amount, a drying property, and ink jet applicability were evaluated.

In particular, a recycle cut version PPC (Plain Paper Copier) sheet "G80" manufactured by Toppan Forms Co., Ltd. was defibrated by a self-made dry defibrating machine to form a fiber body in the form of a web. To the fiber body thus formed, the liquids of Examples 1 to 8 and Comparative Examples 1 to 3 were each applied by an ink jet printer (PX-S160T modified machine, manufactured by Seiko Epson Corporation). Subsequently, heating was performed by a heating roller machine, so that paper having an A4 size was made.

The paper powder generation amount was measured using a particle counter "KR-12A" manufactured by Rion Co., Ltd. at a sample flow rate of 2.83 L/min and a test air volume of 1 L. Five sheets formed as described above were allowed to pass through an ink jet printer "PX-049A" manufactured by Seiko Epson Corporation, and the paper powder generation amount generated in the printer was measured.

The drying property was evaluated by measurement of a moisture amount obtained after the sheet thus formed was dried by heating using a heating roller machine at a temperature of 150° C., a nip pressure of 100 kgf, a nip width of 10 mm, and a nip time of one second. The moisture amount was measured using a heat drying type moisture meter "ML-50" manufactured by A&D Company, Ltd. at a temperature of 23° C. and a relative humidity of 50%.

The evaluation criteria of the drying property are as follows.
A: less than 5 percent by mass
B: 5 to less than 7 percent by mass The ink jet applicability was evaluated using an ink jet printer (PX-S160T-modified machine, manufactured by Seiko Epson Corporation) by an ejection frequency at which liquid droplets each having a volume of 40 pl could be stably and continuously ejected at an ejection rate of 10 m/s.

The evaluation criteria of the ink jet applicability are as follows.
A: A frequency of 20 kHz or more
B: A frequency of 5 to less than 20 kHz The evaluation results of the paper powder generation amount, the drying property, and the ink jet applicability are shown in Table 7.

As shown in Table 7, in Examples 1 to 8, the paper powder generation amount was 10 pieces or less and is smaller than that of each of Comparative Examples 1 to 3. Hence, when the Tg of the thermoplastic resin contained in the liquid is 10° C. or less, and when the average particle diameter of the thermoplastic resin in the liquid is 30 nm or less, the paper powder generation can be suppressed.

When the paper powder generation amount is 10 pieces or less, in the case in which printing is performed by an ink jet printer, nozzle missing cannot be a problem in practice. Accordingly, a printing stability can be improved. In addition, the "nozzle missing" indicates a phenomenon in which since a paper powder is adhered to a nozzle of an ink jet printer, an ink cannot be ejected therefrom.

In Example 4, the drying property was evaluated as "B". The reason for this is that in Example 4, since the resin amount in the liquid is smaller than that in each of the other Examples and Comparative Examples, the application amount of the liquid required to form the sheet is increased. When the application amount of the liquid is increased, the amount of water to be applied is also increased. When the drying property is degraded, curling and cockling are liable to occur. Furthermore, in order to avoid curling and the like, energy for drying is additionally required, and as a result, an increase in size of the apparatus and an increase in cost are required.

In Example 5, the ink jet applicability was evaluated as "B". The reason for this is that in Example 5, since the resin amount in the liquid is larger than that in each of the other Examples and Comparative Examples, the viscosity of the liquid is high. When the liquid is applied by an ink jet method, in the case in which the viscosity of the liquid is high, a fluid resistance of a nozzle and/or a flow path of an ink jet head is increased. Hence, when the ejection frequency is high, an ejection defect occurs. In order to avoid the ejection defect, the ejection frequency is required to be set low, or the size of the ejection liquid droplet is required to be decreased.

In the present disclosure, within the scope including the features and the effects described in the present application, the structure may be partially omitted, and/or the embodiments and modified examples may be arbitrarily combined with each other.

The present disclosure is not limited to the embodiments described above and may be variously changed and/or modified. For example, the present disclosure includes substantially the same structure as the structure described in the embodiment. The substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A fiber body forming method comprising:
applying, to a fiber body containing fibers, a liquid containing a thermoplastic resin which binds the fibers; and
heating the fiber body to which the liquid is applied, wherein
the thermoplastic resin has a glass transition temperature of 10° C. or less, and
the thermoplastic resin in the liquid has an average particle diameter of 30 nm or less.

2. The fiber body forming method according to claim 1, wherein the liquid has a viscosity of 5.0 to 10.0 mPa·s at 25° C.

3. The fiber body forming method according to claim 1, wherein in the applying a liquid, the liquid is applied so that the mass of the thermoplastic resin with respect to the fiber body is 0.03 to 1.0 mg/cm$^2$.

4. The fiber body forming method according to claim 1, wherein the content of the thermoplastic resin in the liquid is more than 5 to less than 15 percent by mass.

5. The fiber body forming method according to claim 1, wherein the thermoplastic resin is selected from a polyurethane and a polyester.

6. The fiber body forming method according to claim 1, wherein in the applying a liquid, the liquid is applied by an ink jet method.

7. The fiber body forming method according to claim 1, further comprising:
depositing fibers to form the fiber body.

8. The fiber body forming method according to claim 1, wherein the liquid contains another thermoplastic resin having a glass transition temperature higher than that of the thermoplastic resin.

* * * * *